US011985501B2

(12) United States Patent
Balmakhtar et al.

(10) Patent No.: US 11,985,501 B2
(45) Date of Patent: May 14, 2024

(54) THIRD GENERATION PARTNERSHIP PROJECT (3GPP) SERVICE DELIVERY TO NON-3GPP USER DEVICES OVER 3GPP N1 LINKS

(71) Applicant: T-Mobile Innovations LLC, Overland Park, KS (US)

(72) Inventors: Marouane Balmakhtar, Fairfax, VA (US); Robert Keith Butler, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 312 days.

(21) Appl. No.: 17/573,992

(22) Filed: Jan. 12, 2022

(65) Prior Publication Data
US 2023/0224706 A1 Jul. 13, 2023

(51) Int. Cl.
*H04W 76/10* (2018.01)
*H04W 12/069* (2021.01)
*H04W 84/12* (2009.01)

(52) U.S. Cl.
CPC ......... *H04W 12/069* (2021.01); *H04W 76/10* (2018.02); *H04W 84/12* (2013.01)

(58) Field of Classification Search
CPC ... H04W 12/069; H04W 76/10; H04W 84/12; H04W 12/06; H04W 76/12; H04W 88/06; H04W 88/16; H04W 92/02
See application file for complete search history.

(56) References Cited

U.S. PATENT DOCUMENTS

| | | | |
|---|---|---|---|
| 10,485,048 B2 | 11/2019 | Zeng et al. | |
| 10,524,166 B2 | 12/2019 | Youn et al. | |
| 10,531,420 B2 | 1/2020 | Li et al. | |
| 10,588,171 B2 | 3/2020 | Ang et al. | |
| 10,674,469 B2 | 6/2020 | Kim et al. | |
| 10,986,602 B2 | 4/2021 | Shan et al. | |
| 11,166,334 B2 | 11/2021 | Wang et al. | |
| 11,375,471 B2 * | 6/2022 | Kim ...................... | H04W 76/12 |
| 11,838,756 B2 * | 12/2023 | Li .......................... | H04W 12/06 |
| 2019/0387401 A1 | 12/2019 | Liao et al. | |
| 2020/0196377 A1 | 6/2020 | Fang et al. | |
| 2020/0280948 A1 * | 9/2020 | Youn ..................... | H04W 76/12 |
| 2021/0022024 A1 * | 1/2021 | Yao ........................ | H04W 24/10 |
| 2021/0141888 A1 * | 5/2021 | Hires ..................... | H04W 12/06 |
| 2022/0417843 A1 * | 12/2022 | Balmakhtar .......... | H04W 76/12 |

* cited by examiner

*Primary Examiner* — Juan M Guillermety

(57) ABSTRACT

A Third Generation Partnership Project (3GPP) gateway serves a non-Third Generation Partnership Project (non-3GPP) user device over a 3GPP N1 link. The gateway receives a transaction request from the non-3GPP user device. The gateway translates the transaction request into a 3GPP request. The gateway transfers the 3GPP request to a 3GPP network and receives an authentication request from the 3GPP network. The gateway generates and transfers an authentication response based on the transaction request and the authentication request to the 3GPP network. In response to the authentication, the gateway establishes the 3GPP N1 link with the 3GPP network for the non-3GPP user device. The gateway exchanges user data with the non-3GPP user device. The gateway interworks the user data and N1 signaling. The gateway exchanges the N1 signaling with the 3GPP network. The 3GPP network interworks the N1 signaling and the user data and exchanges the user data.

20 Claims, 12 Drawing Sheets

THIRD GENERATION PARTNERSHIP PROJECT (3GPP) SERVICE DELIVERY TO NON-3GPP USER DEVICES OVER 3GPP N1 LINKS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Bluetooth Low Energy (BLE), Low-Power Wide Area Network (LP-WAN), Internet-of-Things (IoT), SigFox, IEEE 802.15.4 (ZigBee), Radio Frequency Identification (RFID), Near Field Communications (NFC), Multi-Floor Controller (MFC), and the like. The wireless access nodes exchange network signaling and user data with network elements that are often clustered together into wireless network cores. The wireless network elements comprise Access and Mobility Management Functions (AMFs), User Plane Functions (UPFs), and the like.

Some wireless communication networks like 5GNR and LTE are Third Generation Partnership Project (3GPP) networks. Some wireless user devices like smartphones are 3GPP devices that are configured to use the 3GPP networks. The 3GPP user devices wirelessly access the 3GPP networks over 5GNR and LTE access nodes called gNodeBs. The 3GPP user devices may also use non-3GPP protocols like WIFI to access the 3GPP networks. The 3GPP networks deploy different network element combinations to serve non-3GPP access to the 3GPP user devices including: 1) Untrusted Non-3GPP Access Points (UNAPs) and non-3GPP Interworking Functions (IWFs), 2) Trusted Non-3GPP Access Points (TNAPs) and Trusted Network Gateway Functions (TNGFs), 3) Trusted Wireless Local Area Network Access Points (TWAPs) and Trusted Wireless Local Area Network Interworking Functions (TWIFs), and 4) Fifth Generation Residential Gateways (5G-RGs) and Wireline Access Gateway Functions (W-AGFs). The 3GPP networks authenticate and authorize the 3GPP user devices and establish N1 signaling links to the 3GPP user devices. The 3GPP user devices and networks use the N1 signaling links to control data communication service delivery over other data connections.

The 3GPP networks use 3GPP gateways to expand their services over non-3GPP networks. For example, a 3GPP gateway may communicate with 3GPP user devices over non-3GPP protocols like WIFI or bluetooth, and the 3GPP user devices communicate with the 3GPP networks over the 3GPP gateway. The 3GPP networks establish N1 links that traverse the 3GPP gateways and non-3GPP links to reach the 3GPP user devices.

The 3GPP networks also use the 3GPP gateways to expand their services to non-3GPP user devices. For example, a 3GPP gateway may communicate with non-3GPP user device over non-3GPP protocols like WIFI or bluetooth, and the non-3GPP user devices communicate with the 3GPP networks over the 3GPP gateway. The 3GPP networks do not establish N1 links that traverse the 3GPP gateways and non-3GPP links to reach the non-3GPP user devices. Unfortunately, the non-3GPP user devices do not exert effective network control over N1 links. Moreover, the 3GPP gateways do not use N1 links to efficiently serve the non-3GPP user devices.

TECHNICAL OVERVIEW

A Third Generation Partnership Project (3GPP) gateway serves a non-Third Generation Partnership Project (non-3GPP) user device over a 3GPP N1 link. The gateway receives a transaction request from the non-3GPP user device. The gateway translates the transaction request into a 3GPP request. The gateway transfers the 3GPP request to a 3GPP network and receives an authentication request from the 3GPP network. The gateway generates and transfers an authentication response based on the transaction request and the authentication request to the 3GPP network. In response to the authentication, the gateway establishes the 3GPP N1 link with the 3GPP network for the non-3GPP user device. The gateway exchanges user data with the non-3GPP user device. The gateway interworks the user data and N1 signaling. The gateway exchanges the N1 signaling with the 3GPP network. The 3GPP network interworks the N1 signaling and the user data and exchanges the user data.

DETAILED DESCRIPTION

Figure 1:
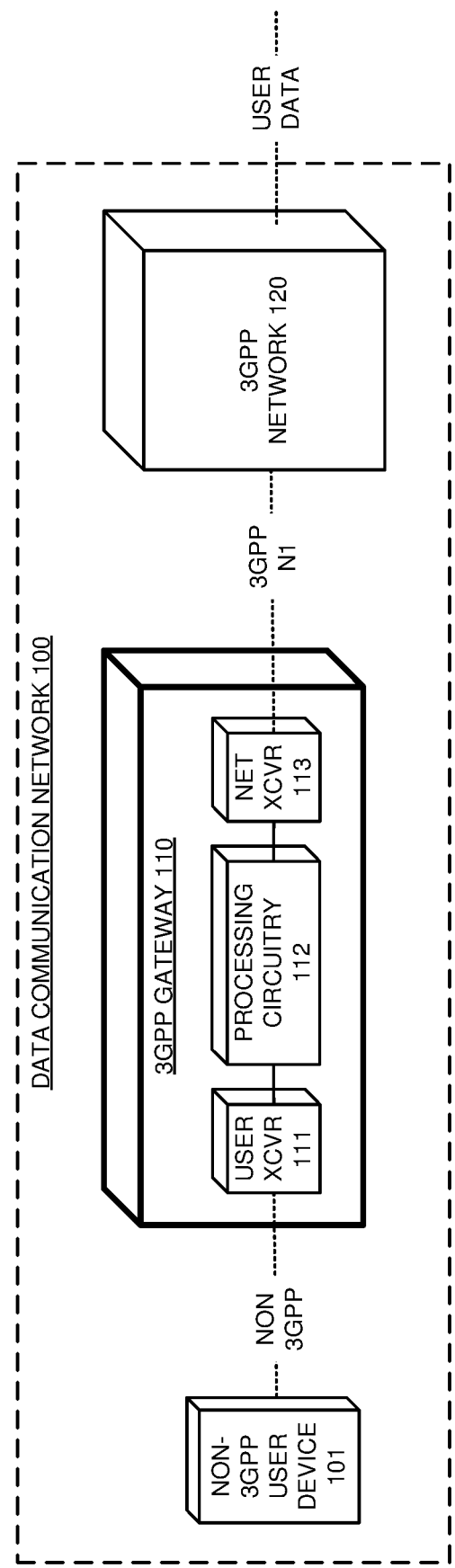
FIG. 1 illustrates an exemplary Third Generation Partnership Project (3GPP) gateway to serve a non-Third Generation Partnership Project (non-3GPP) user device over a 3GPP N1 link.

FIG. 1 illustrates exemplary Third Generation Partnership Project (3GPP) gateway 110 to serve non-Third Generation Partnership Project (non-3GPP) user device 101 over a 3GPP N1 link. Data communication network 100 comprises non-3GPP user device 101, 3GPP gateway 110, and 3GPP network 120. 3GPP gateway 110 comprises user transceiver (XCVR) 111, processing circuitry 112, and network transceiver 113. Non-3GPP user device 101 comprises a computer, phone, sensor, robot, or some other data appliance with non-3GPP communication circuitry. Exemplary device services for device 101 include machine-control, data collection, internet-access, and/or some other networking product.

Various examples of network operation and configuration are described herein. In some examples, user transceiver 111 in 3GPP gateway 110 receives a non-3GPP request from non-3GPP user device 101 and transfers the request to processing circuitry 112. Processing circuitry 112 translates the non-3GPP request into a 3GPP request. For example, processing circuitry 112 may host a data structure that correlates transaction requests from non-3GPP user devices with 3GPP signaling for 3GPP network 120. Processing circuitry 112 transfers the 3GPP request to network transceiver 113. Network transceiver 113 transfers the 3GPP request to 3GPP network 120. 3GPP network 120 receives the 3GPP request and transfers an authentication request to network transceiver 113 in 3GPP gateway 110. Network transceiver 113 receives the authentication request from 3GPP network 120 and transfers the authentication request to processing circuitry 110. Processing circuitry 113 generates an authentication response based on the non-3GPP request from user device 101 and the authentication request from network 120. For example, processing circuitry 112 may host a data structure that correlates user device identifiers with 3GPP network credentials. Processing circuitry 113 transfers the authentication response to network transceiver 113. Network transceiver 113 transfers the authentication response to 3GPP network 120. 3GPP network 120 authenticates non-3GPP user device 101 based on the authentication response and responsively establishes at least one N1 link with 3GPP gateway 110 for non-3GPP user device 101. The N1 link(s) may be single mode or multi-mode. Processing circuitry 112 establishes the 3GPP N1 link for non-3GPP user device 101 with 3GPP network 120 over network transceiver 113. User transceiver 111 exchanges user data with the non-3GPP user device 101 and exchanges the user data with processing circuitry 112. Processing circuitry 112 interworks the user data and N1 signaling. Processing circuitry 112 exchanges the N1 signaling with network transceiver 113. Network transceiver 113 exchanges the N1 signaling with 3GPP network 120. 3GPP network 120 interworks the N1 signaling and the user data. 3GPP network 120 exchanges the user data with an external data system. Advantageously, non-3GPP user device 101 exerts effective network control over 3GPP N1 links. Moreover, 3GPP gateway 110 uses the N1 links to efficiently serve non-3GPP user devices 101.

In some examples, the above communications between 3GPP gateway 110 and 3GPP network 120 comprise communications between 3GPP gateway 110 and a 3GPP Access and Mobility Function (AMF). In some examples the communications between 3GPP gateway 110 and the 3GPP AMF comprise network signaling over at least one of the following: 1) an Untrusted Non-3GPP Access Point (UNAP) and a Non-3GPP Interworking Function (IWF), 2) a Trusted Non-3GPP Access Point (TNAP) in a Trusted Non-3GPP Access Network (TNAN) and a Trusted Network Gateway Function (TNGF), 3) a Trusted Wireless Local Area Network Access Point (TWAP) and a Trusted Wireless Local Area Network Interworking Function (TWIF) in a Trusted Wireless Local Area Network Access Network (TWAN), 4) a 3GPP gNodeB in a 3GPP Radio Access Network (RAN), 5) Wireline Access Gateway Function (W-AGF) in a Wireline Fifth Generation Access Network (W-5GAN), 6) a Fifth Generation Residential Gateway (5G-RG) and a Wireline Access Gateway Function (W-AGF) in a W-5GAN, 7) a 5G-RG, a 3GPP gNodeB, and a W-AGF. Other signaling paths could be used.

Non-3GPP user device 101 and user transceiver 111 communicate over user connections that comprise metallic wiring, glass fibers, radio channels, or some other communication media. The user connections use non-3GPP technologies like Institute of Electrical and Electronic Engineers (IEEE) 802.11 (WIFI), Bluetooth Low Energy (BLE), Internet-of-Things (IoT), SigFox, IEEE 802.15.4 (ZigBee), Radio Frequency Identification (RFID), Near Field Communications (NFC), Multi-Floor Controller (MFC), IEEE 802.3 (ETHERNET), Time Division Multiplex (TDM), Data Over Cable System Interface Specification (DOCSIS), and/or some other data communication protocols. Network transceiver 113 and 3GPP network 120 communicate over network connections that comprise metallic wiring, glass fibers, radio channels, or some other communication media. The network connections may use 3GPP technologies like Fifth Generation New Radio (5GNR) and Long Term Evolution (LTE), and Low-Power Wide Area Network (LP-WAN). The network connections may also use non-3GPP technologies like WIFI, BLE, IoT, SigFox, ZigBee, RFID, NFC, MFC, ETHERNET, IP, TDM, DOCSIS, virtual switching, inter-processor communication, bus interfaces, and/or some other data communication protocols. Non-3GPP user device 101, 3GPP gateway 110, and 3GPP network 120 comprise microprocessors, software, memories, transceivers, radios, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of data communication network 100 as described herein.

Figure 2:
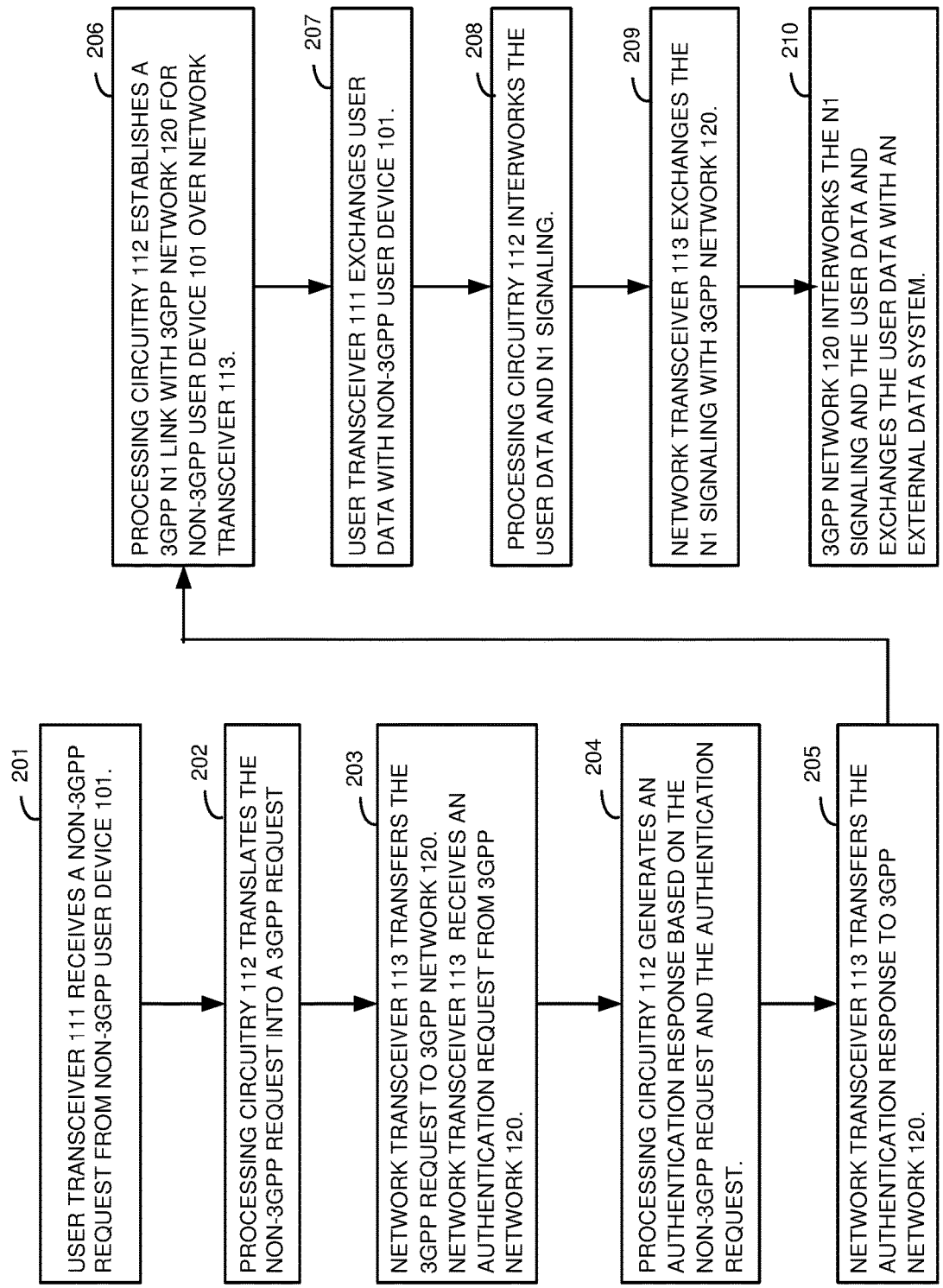
FIG. 2 illustrates an exemplary operation of the 3GPP gateway to serve the non-3GPP user device over the 3GPP N1 link.

FIG. 2 illustrates an exemplary operation of 3GPP gateway 110 to serve non-3GPP user device 101 over the 3GPP N1 link. The operation may differ in other examples. User transceiver 111 in 3GPP gateway 110 receives a non-3GPP request from non-3GPP user device 101 (201). Processing circuitry 112 translates the non-3GPP request into a 3GPP request (202). Network transceiver 113 transfers the 3GPP request to 3GPP network 120 and receives an authentication request from 3GPP network 120 (203). Processing circuitry 113 generates an authentication response based on the non-3GPP request and the authentication request (204). Network transceiver 113 transfers the authentication response to 3GPP network 120 (205). Processing circuitry 112 establishes a 3GPP N1 link with 3GPP network 120 for non-3GPP user device 101 over network transceiver 113 (206). User transceiver 111 exchanges user data with non-3GPP user device 101 (207). Processing circuitry 112 interworks the user data and N1 signaling (208). Network transceiver 113 exchanges the N1 signaling with 3GPP network 120 (209). 3GPP network 120 interworks the N1 signaling and the user data and exchanges the user data with an external data system (210).

Figure 3:
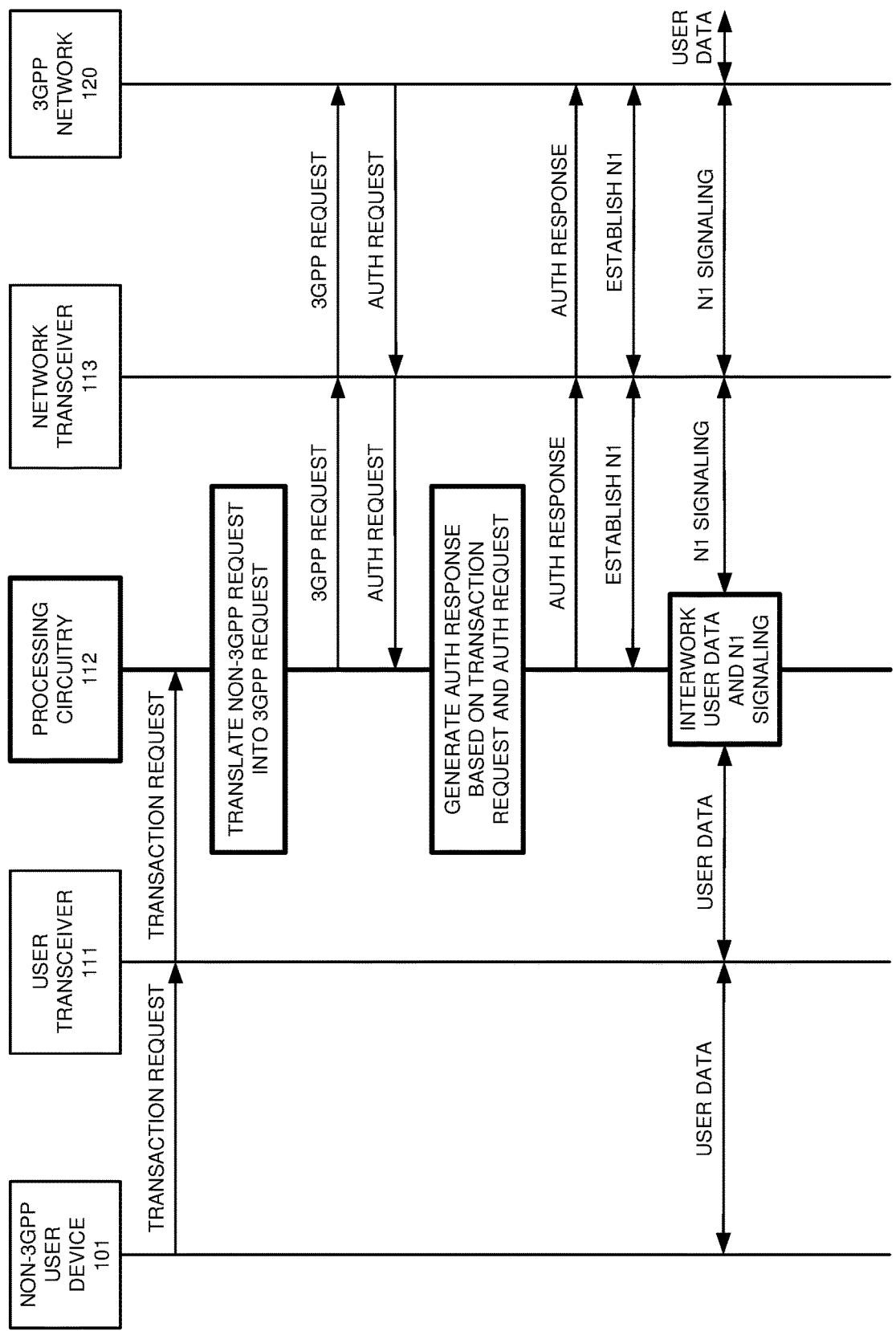
FIG. 3 illustrates an exemplary operation of the 3GPP gateway to serve the non-3GPP user device over the 3GPP N1 link.

FIG. 3 illustrates an exemplary operation of 3GPP gateway 110 to serve non-3GPP user device 101 over the 3GPP N1 link. The operation may differ in other examples. Non-3GPP user device 101 transfers a non-3GPP request to user transceiver 111. User transceiver 111 receives the non-3GPP request and transfers the request to processing circuitry 112. Processing circuitry 112 translates the non-3GPP request into a 3GPP request. Processing circuitry 112 transfers the 3GPP request to network transceiver 113. Network transceiver 113 transfers the 3GPP request to 3GPP network 120. 3GPP network 120 receives the 3GPP request and transfers an authentication request to network transceiver 113. Network transceiver 113 receives the authentication request from 3GPP network 120 and transfers the authentication request to processing circuitry 112. Processing circuitry 112 generates an authentication response based on the non-3GPP request and the authentication request. Processing circuitry 112 transfers the authentication response to network transceiver 113. Network transceiver 113 transfers the authentication response to 3GPP network 120. 3GPP network 120 authenticates non-3GPP user device 101 and responsively establishes an N1 link with 3GPP gateway 110 for non-3GPP user device 101. Processing circuitry 112 establishes the 3GPP N1 link for non-3GPP user device 101 with 3GPP network 120 over network transceiver 113. User transceiver 111 exchanges user data with the non-3GPP user device 101 and exchanges the user data with processing circuitry 112. Processing circuitry 112 interworks the user data and N1 signaling. Processing circuitry 112 exchanges the N1 signaling with network transceiver 113. Network transceiver 113 exchanges the N1 signaling with 3GPP network 120. 3GPP network 120 interworks the N1 signaling and the user data. 3GPP network 120 exchanges the user data with an external data system.

Figure 4:
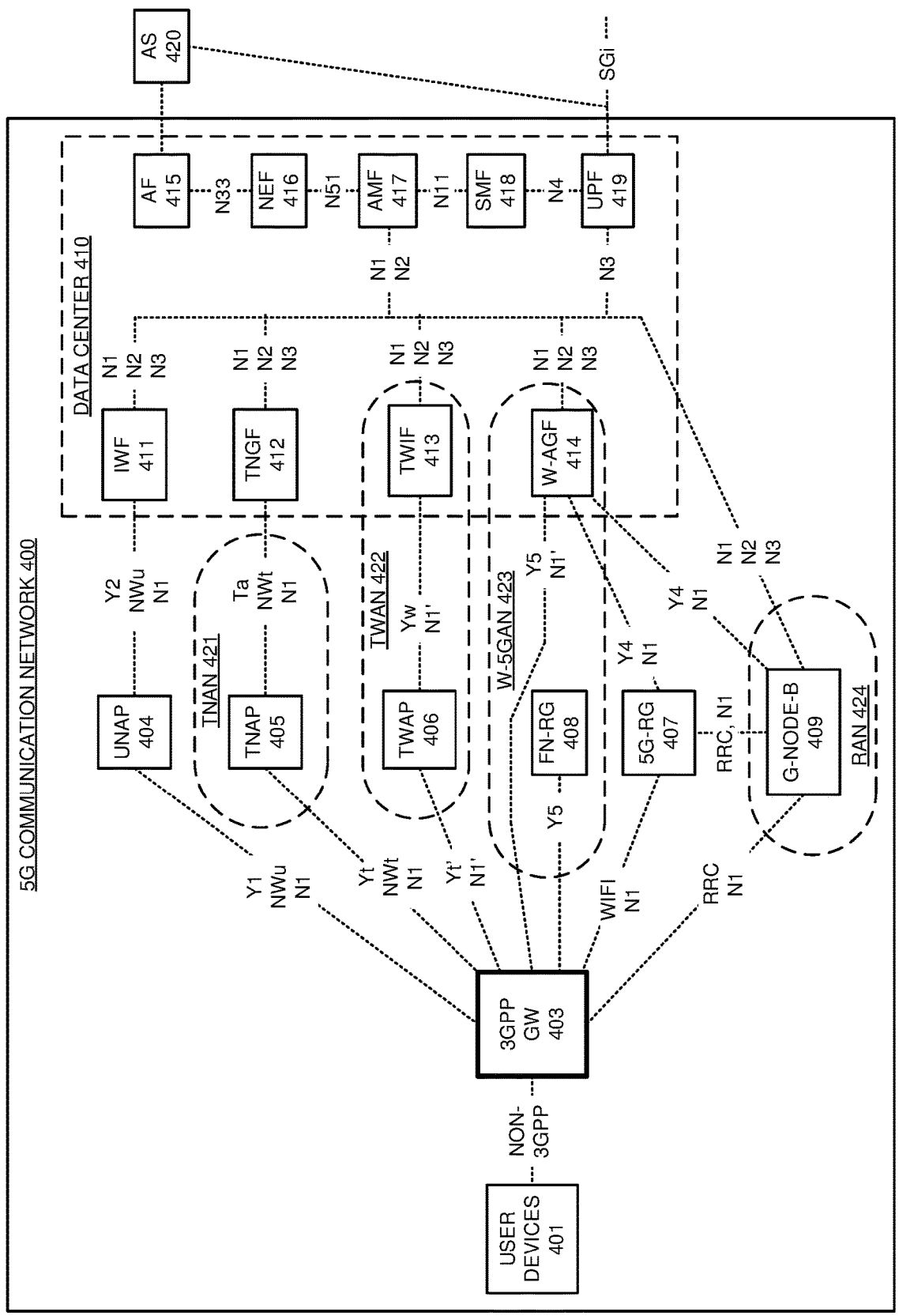
FIG. 4 illustrates an exemplary Fifth Generation (5G) communication network that comprises a 3GPP gateway to serve a non-3GPP user device over a 3GPP N1 link.

FIG. 4 illustrates exemplary Fifth Generation (5G) communication network 400 that comprises 3GPP gateway 403 to serve non-3GPP user devices 401 over 3GPP N1 links. 5G communication network 400 comprises an example of data communication network 100, although network 100 may differ. 5G communication network 400 comprises: non-3GPP user devices 401, 3GPP gateway (GW) 403, Untrusted Non-3GPP Access Point (UNAP) 404, Trusted Non-3GPP Access Point (TNAP) 405, Trusted Wireless Local Area Network Access Point (TWAP) 406, Fifth Generation Residential Gateway (5G-RG) 407, Fixed Network Residential Gateway (FN-RG) 408, 3GPP gNodeB 409, and network data center 410. Network data center 410 comprises non-3GPP Interworking Function (IWF) 411, Trusted Network Gateway Function (TNGF) 412, Trusted Wireless Local Area Network Interworking Function (TWIF) 413, Wireline Access Gateway Function (W-AGF) 414, Application Function (AF) 415, Network Exposure Function (NEF) 416, Access and Mobility Management Function (AMF) 417, Session Management Function (SMF) 418, and User Plane Function (UPF) 419. FN-RG 408 may comprise a Fixed Network-Cable Residential Gateway (FN-CRG), Fixed Network-Broadband Residential Gateway (FN-BRG), or some other type of RG.

Trusted Non-3GPP Access Network (TNAN) 421 comprises TNAP 405 and other TNAPs that are omitted for clarity. Trusted Wireless Local Area Network Access Network (TWAN) 422 comprises TWAP 406, TWIF 413, and other TWAPs that are omitted for clarity. Wireline Fifth Generation Access Network (W-5GAN) 423 comprises FN-RG 408, W-AGF 414, and other FN-RGs that are omitted for clarity. Radio Access Network (RAN) 424 comprises 3GPP gNodeB 409 and other 3GPP gNodeBs that are omitted for clarity. 5G communication network 400 comprises more user devices, 3GPP GWs, UNAPs, TNANs, TWANs, W-5GANs, RANs, and 5G-RGs that are omitted for clarity. AF 415 is coupled to external Application Server (AS) 420, and the number of AS is restricted for clarity. UPF 419 is coupled to external data systems that are also omitted for clarity.

3GPP GW 403 communicates with AMF 417 to establish multiple N1 links for its own use. The number of simultaneous N1 links may be restricted and GW 403 may use only a few of these N1 links simultaneously, although the number of simultaneous N1 links may not as restricted in other examples. 3GPP GW 403 uses its own N1 links to establish additional N1 links for non-3GPP user devices 401. 3GPP GW 403 terminates its own N1 links and the additional N1 links for non-3GPP user devices 401. 3GPP GW 403 interworks user data for user devices 401 and N1 signaling for AMF 417. AMF 417 interworks the N1 signaling with N51 data for NEF 416. NEF 416 interworks the N51 data with N33 data for AF 415. AF 415 interworks the N33 data with the user data for AS 420. Thus, 5G communication network 400 establishes user data links between user devices 401 and AS 420 over non-3GPP links, N1, N51, N33, and AF/AS links. 3GPP GW 403 hosts a data structure that correlates non-3GPP transaction requests from user devices 402 with 3GPP network signaling to trigger the requested transactions.

The configuration of 3GPP GW 403 may vary. Some of the communication interfaces could be omitted and others added. For example, one version of GW 403 may be configured to use only UNAPs and TNAPs, while another version of GW 403 may be configured to only use 5G-RGs and gNodeBs. Yet another version of GW 403 may be configured to only use all of the communication interfaces shown on FIG. 4. Non-3GPP GW 403 could be configured with software for all of the communication interfaces shown on FIG. 4 and only execute the software for the communication interfaces in use. Alternatively, Non-3GPP GW 403 could download or be configured with the software for its available communication interfaces. The version of 3GPP GW 403 described below has all of the communication interfaces on FIG. 4.

3GPP GW 403 communicates with UNAP 404 over Y1 to establish NWu communications with IWF 411 over Y1 and Y2. 3GPP GW 403 communicates with AMF 417 over NWu and N2 to establish N1 communications with AMF 417. 3GPP GW 403 communicates with TNAP 405 over Yt to establish NWt communications with TNGF 412 over Yt and Ta. 3GPP GW 403 communicates with AMF 417 over NWt and N2 to establish N1 communications with AMF 417. 3GPP GW 403 communicates with TWAP 406 over Yt' and communicates with TWIF 422 over Yt' and Yw. 3GPP GW 403 communicates with AMF 417 over Yt', Yw, and N2 to establish N1 communications with AMF 417. 3GPP GW 403 communicates with W-AGF 414 over Y5. 3GPP GW 403 communicates with AMF 417 over Y5 and N2 to establish N1 communications with AMF 417. 3GPP GW 403 communicates with 5G-RG 407 over WIFI and communicates with W-AGF 414 over WIFI and Y4. 3GPP GW 403 communicates with AMF 417 over WIFI, Y4, and N2 to establish N1 communications with AMF 417. 3GPP GW 403 communicates with gNodeB 409 over Radio Resource Control (RRC). 3GPP GW 403 communicates with AMF 417 over RRC and N2 to establish N1 communications with AMF 417. 3GPP GW 403 may communicate with W-AGF 414 over a direct link, 5G-RG 407, gNodeB 409, or 5G-RG 407-gNodeB 409. The N1 communications established above may use single-mode or multi-mode.

One of user devices 401 comprises an atmospheric sensor—referred to below as sensor 401. Using a secure link to AF 415, AS 420 subscribes to user data from sensor 401. AF 415 subscribes to the user data from sensor 401 over the N33 to NEF 416. NEF 416 subscribes to the user data from sensor 401 over the N51 to AMF 417.

Sensor 401 identifies a need for external data communications and transfers a non-3GPP request for a data transaction to 3GPP GW 403. The request may be a simple Application Programming Interface (API) call that is suitable for the capabilities of sensor 401. 3GPP GW 403 receives the non-3GPP transaction request from sensor 401 over a communication interface like WIFI, bluetooth, or the like. To initiate the data communication transaction, 3GPP GW 403 translates the non-3GPP request into an N1 message and transfers the N1 message to AMF 417 over one of the N1 links for 3GPP GW 403. AMF 417 receives the N1 message and transfers an authentication request to 3GPP GW 403 for sensor 401.

3GPP GW 403 receives the authentication request from AMF 417 and interacts with AMF 417 over its N1 to authenticate and authorize sensor 401 for the data transaction. The authentication could be traditional where 3GPP GW 403 translates an ID for sensor 401 into a suitable network ID and hashes the network ID and random number into an authentication result for AMF 417. Alternatively, 3GPP GW 403 may retrieve a digital certificate based on the ID of sensor 401 and transfer the digital certificate to AMF 417 for validation with a public key of a certificate authority. In response to authentication, AMF 417 authorizes sensor 401 for N1 service (possibly with additional restrictions) and establishes the N1 for sensor 401 with 3GPP GW 403. The N1 may use single-mode or multi-mode.

3GPP GW 403 receives user data from sensor 401 like a carbon dioxide alert. 3GPP GW 403 transfers the user data to AMF 417 over the N1 for sensor 401. AMF 417 transfers the user data from sensor 401 to NEF 416 over the N51 in response to the sensor 401 data subscription from NEF 417. NEF 416 transfers the user data to AF 415 over the N33 in response to the sensor 401 data subscription from AF 415. AF 416 transfers the user data to AS 420 over the secure link in response to the sensor 401 data subscription from AS 420.

Over AF 415, AS 420 requests another atmospheric reading from sensor 401 like humidity. Over the N33 to NEF 416, AF 415 requests a humidity reading from sensor 401. Over the N51 to AMF 417, NEF 416 requests the humidity reading from sensor 401. Over the N1 to 3GPP GW 403 for sensor 401, AMF 417 requests the humidity reading from sensor 401. Over the user interface to sensor 401 (WIFI, bluetooth, and the like), 3GPP GW 403 requests the humidity reading. Sensor 401 takes the humidity reading responsive to the request and transfers the requested humidity reading to 3GPP GW 403 over the user interface. 3GPP GW 403 transfers the requested humidity reading to AMF 417 over the N1 for sensor 401. AMF 417 transfers the requested humidity reading to NEF 416 over the N51. NEF 416 transfers the requested humidity reading to AF 415 over the N33. AF 416 transfers the requested humidity reading from sensor 401 to AS 420 over the secure link.

Sensor 401 and/or AS 420 may request communication services to external data systems for sensor 401 in the manner described above. In these examples, AMF 417 directs SMF 418 to serve data communications to sensor 401, and SMF 418 directs UPF 419 to serve data communications to sensor 401. Over N2, AMF 418 signals one or more of IWF 411, TNGF 412, TWIF 413, W-AGF 414, and gNodeB 409 to serve the data communications to sensor 401. Over N1 for sensor 401, AMF 418 signals 3GPP GW 403 to serve the data communications to sensor 401. Sensor 401 and external data systems (including AS 420) may then communicate over 3GPP GW 403, UPF 419, and some other components of network 400. For example, sensor 401 and AS 420 may communicate over 3GPP GW 403, TNAP 405, TNGF 412, and UPF 419.

AS 420 may direct AF 415 to have 3GPP GW 403 to initiate communications with sensor 401. AF 415 directs NEF 416 to have 3GPP GW 403 to initiate communications with sensor 401. NEF 416 directs AMF 417 to have 3GPP GW 403 to initiate communications with sensor 401. AMF 417 directs GW 403 over its N1 to initiate communications with sensor 401. Over the user interface, 3GPP GW 403 directs sensor 401 to initiate a data transaction. Authentication, authorization, and user data transfers may then occur as described above.

Another one of user devices 401 comprises a video camera—referred to below as camera 401. Using a secure link to AF 415, AS 420 subscribes to user data from camera 401. AF 415 subscribes to the user data from camera 401 over the N33 to NEF 416. NEF 416 subscribes to the user data from camera 401 over the N51 to AMF 417.

Camera 401 identifies a need for external data communications and transfers a non-3GPP request for a data transaction to 3GPP GW 403. The request may be a simple API call that is suitable for the capabilities of camera 401. 3GPP GW 403 receives the non-3GPP transaction request from camera 401 over a communication interface like WIFI, bluetooth, or the like. To initiate the data communication transaction, 3GPP GW 403 translates the non-3GPP request into an N1 message and transfers the N1 message to AMF 417 over one of the N1 links for 3GPP GW 403. AMF 417 receives the N1 message and transfers an authentication request to 3GPP GW 403.

3GPP GW 403 receives the authentication request from AMF 417 and interacts with AMF 417 over its N1 to authenticate and authorize camera 401 for the data transaction. The authentication could be traditional where 3GPP GW 403 translates an ID for camera 401 into a suitable network ID and hashes the network ID into an authentication result for AMF 417. 3GPP GW 403 may retrieve a digital certificate based on the ID of camera 401 and transfer the digital certificate to AMF 417 for validation with a public key. In response to authentication, AMF 417 authorizes camera 401 for an N1 (possibly with specific restrictions) and establishes the N1 for camera 401 with 3GPP GW 403. The N1 may use single-mode or multi-mode.

3GPP GW 403 receives user data from camera 401 like a photograph. 3GPP GW 403 transfers the user data to AMF 417 over the N1 for camera 401. AMF 417 transfers the user data from camera 401 to NEF 416 over the N51 in response to the camera 401 data subscription from NEF 417. NEF 416 transfers the user data to AF 415 over the N33 in response to the camera 401 data subscription from AF 415. AF 416 transfers the user data to AS 420 over the secure link in response to the camera 401 data subscription from AS 420.

Over AF 415, AS 420 requests another photograph taken by camera 401 at a specific day and time. Over the N33 to NEF 416, AF 415 requests the photograph taken by camera 401 at the specific day and time. Over the N51 to AMF 417, NEF 416 requests the photograph taken by camera 401 at the specific day and time. Over the N1 for camera 401 to 3GPP GW 403, AMF 417 requests the photograph that was taken by camera 401 at the specific day and time. Over the user interface to camera 401 (WIFI, bluetooth, and the like), 3GPP GW 403 requests the photograph taken by camera 401 at the specific day and time. Camera 401 transfers the requested photograph to 3GPP GW 403 over the user interface to 3GPP GW 403. 3GPP GW 403 transfers the requested photograph to AMF 417 over the N1 for camera 401. AMF 417 transfers the requested photograph to NEF 416 over the N51. NEF 416 transfers the requested photograph to AF 415 over the N33. AF 416 transfers the requested photograph to AS 420 over the secure link.

Camera 401 and/or AS 420 may request communication services to external data systems for camera 401 in the manner described above. In these examples, AMF 417 directs SMF 418 to serve data communications to camera 401, and SMF 418 directs UPF 419 to serve data communications to camera 401. Over N2, AMF 418 signals one or more of IWF 411, TNGF 412, TWIF 413, W-AGF 414, and gNodeB 409 to serve the data communications to camera 401. Over N1, AMF 418 signals 3GPP GW 403 to serve the data communications to camera 401. Camera 401 and external data systems (including AS 420) may then communicate over 3GPP GW 403, UPF 419, and other components of network 400. For example, camera 401 and a Content Delivery Network (CDN) may communicate over 3GPP GW 403, 5G-RG 407, W-AGF 414, and UPF 419.

AS 420 may direct AF 415 to have 3GPP GW 403 to initiate communications with camera 401. AF 415 directs NEF 416 to have 3GPP GW 403 to initiate communications with camera 401. NEF 416 directs AMF 417 to have 3GPP GW 403 to initiate communications with camera 401. AMF 417 directs GW 403 over its N1 to initiate communications with camera 401. Over the user interface, 3GPP GW 403 directs camera 401 to initiate a data transaction. Authentication, authorization, and user data transfers may then occur as described above.

In W-5GAN 423, FN-RG 408 serves its own user devices which are omitted for clarity. To serve its own user devices, FN-RG 408 communicates with 3GPP GW 403 over Y5. 3GPP GW 403 extends the Y5 to W-AGF 414. 3GPP GW 403 may use its N1 to authenticate and authorize FN-RG 408 for Y5 extension in a similar manner to user devices 401. FN-RG 408 may serve its own user devices over 3GPP GW 403, W-AGF 414, and UPF 419 using AMF 417 and SMF 418 for control.

Figure 5:
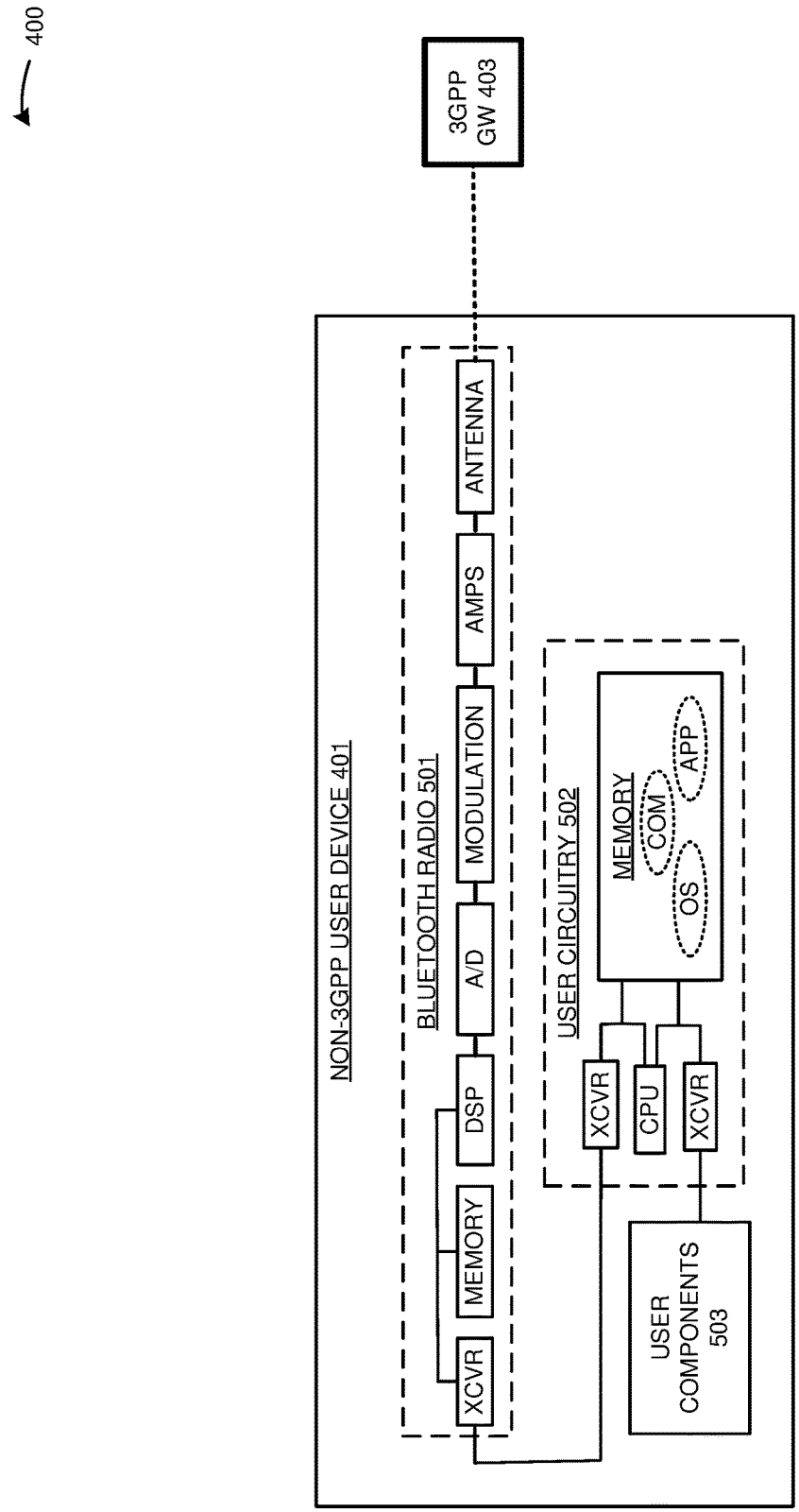
FIG. 5 illustrates an exemplary non-3GPP user device in the 5G communication network.

FIG. 5 illustrates an exemplary one of non-3GPP user devices 401 in 5G communication network 400 referred to as non-3GPP user device 401 below. Non-3GPP user device 401 below comprises an example of non-3GPP user device 101, although device 101 may differ. Non-3GPP user device 401 comprises bluetooth radio 501, user circuitry 502, and user components 503. User components 503 comprise sensors, controllers, displays, or some other user apparatus that generates and/or consumes user data. Bluetooth radio 501 comprises an antenna, amplifiers, filters, modulation, analog-to-digital interfaces, DSP, memory, and transceivers that are coupled over bus circuitry. User circuitry 502 comprises memory, CPU, transceivers (XCVRs) that are coupled over bus circuitry. The memory in user circuitry 502 stores an operating system (OS), user application (APP), and communication application (COM). The communication application directs the wireless exchange of data with 3GPP GW 403 over bluetooth using simple transaction requests. The antenna in bluetooth radio 501 are wirelessly coupled to 3GPP GW 403 over a bluetooth link. The transceiver in bluetooth radio 501 is coupled to a transceiver in user circuitry 502. A transceiver in user circuitry 502 is coupled to user components 503. The CPU in user circuitry 502 executes the operating system, user application, and communication application to exchange data with 3GPP GW 403 over bluetooth radio 501.

Figure 6:
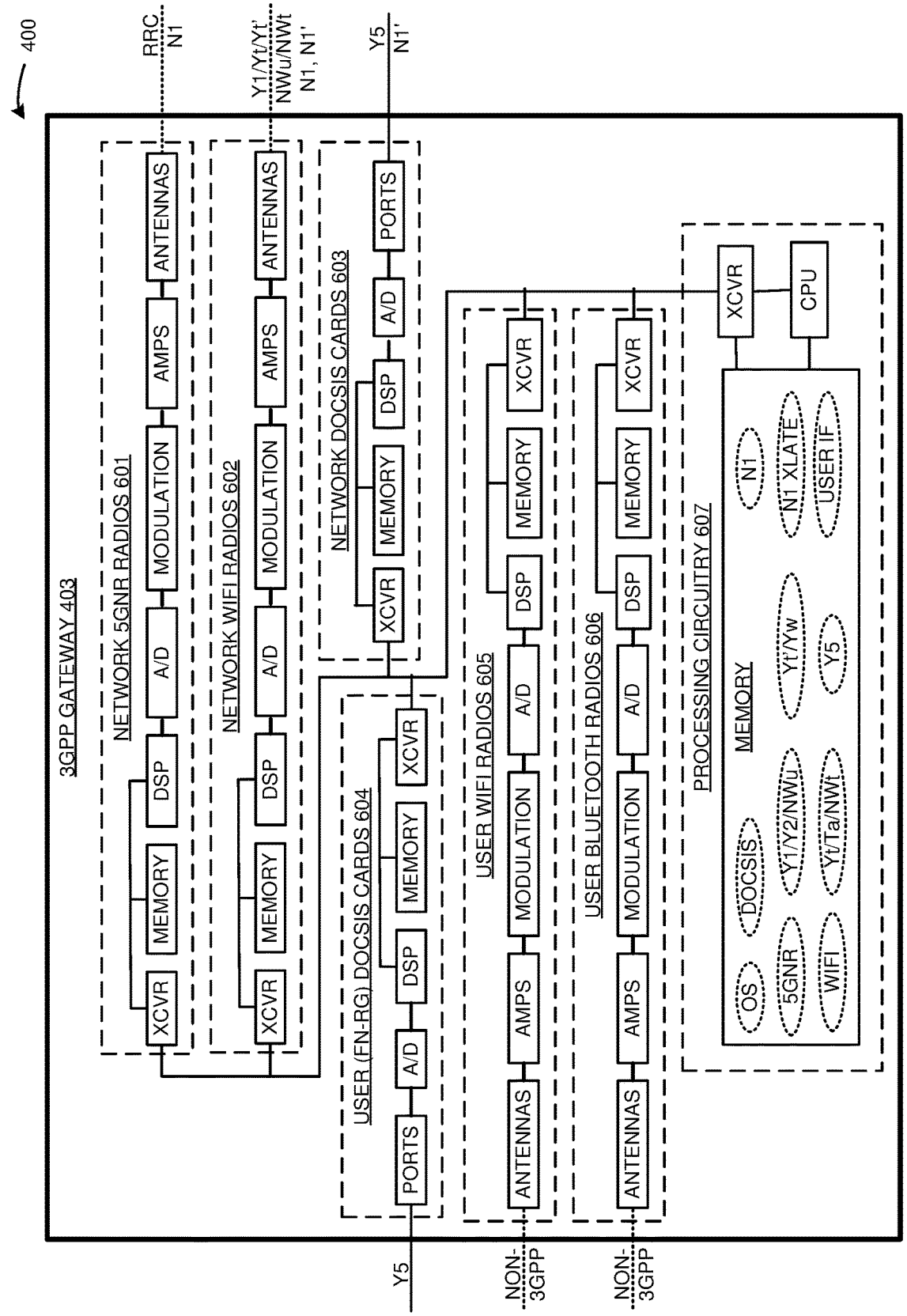
FIG. 6 illustrates an exemplary 3GPP gateway in the 5G communication network.

FIG. 6 illustrates exemplary 3GPP gateway 403 in 5G communication network 400. 3GPP gateway 403 comprises an example of 3GPP gateway 110, although gateway 110 may differ. 3GPP gateway 403 comprises network Fifth Generation New Radio (5GNR) radios 601, network WIFI radios 602, network Data Over Cable System Interface Specification (DOCSIS) cards 603, user (FN-RG) DOCSIS cards 604, user WIFI radios 605, user bluetooth radios 606, and processing circuitry 607. Radios 601-602 and 605-606 comprise antennas, amplifiers, filters, modulation, analog-to-digital interfaces, DSP, memory, and transceivers that are coupled over bus circuitry. Cards 603-604 comprise ports, analog-to-digital interfaces, DSP, memory, and transceivers that are coupled over bus circuitry. Processing circuitry 607 comprises memory, CPU, and transceivers that are coupled over bus circuitry. The memory in processing circuitry 607 stores an operating system and communication applications for 5GNR, WIFI, DOCSIS, Y1/Y2/NWu, Yt/Ta/NWt, Yt'/Yw, Y5, N1, N1 translation, and user interface (IF).

The antennas in network 5GNR radios 601 are wirelessly coupled to gNodeB 409 over Radio Resource Control (RRC) links that support N1. The antennas in network WIFI radios 602 are wirelessly coupled to UNAP 404 over Y1 links that support NWu and N1. The antennas in network WIFI radios 602 are wirelessly coupled to TNAP 405 over Yt links that support NWt and N1. The antennas in network WIFI radios 602 are wirelessly coupled to TWAP 405 over Yt' links that support N1'. The antennas in network WIFI radios 602 are wirelessly coupled to 5G-RG 407 over WIFI links that support N1. The ports in network DOCSIS cards 603 are wireline coupled to W-AGF 414 over Y5 links that support N1'. The ports in user DOCSIS cards 604 are wireline coupled to FN-RGs like FN-RG 408. The antennas in user WIFI radios 605 are wirelessly coupled to user devices 401 over WIFI links. The antennas in user bluetooth radios 606 are wirelessly coupled to user devices 401 over bluetooth links. The transceivers in radios and cards 601-606 are coupled to transceivers in processing circuitry 607 over bus circuitry.

The CPU in processing circuitry 607 executes the operating system and network applications to exchange data with user devices 401, UNAP 404, TNAP 405, TWAP 406, 5G-RG 407, FN-RG 408, gNodeB 409, IWF 411, TNGF 412, TWIF 413, W-AGF 414, AMF 417, and UPF 419. The user interface drives interactions with non-3GPP user devices 401. The N1 translation interworks user transaction requests with 3GPP N1 signaling. 3GPP GW 403 may be simplified in some examples by removing some communication interfaces. For example, DOCSIS cards 603-604, the DOCSIS application, and the Y5 application could be omitted. In another example, bluetooth radios 605 could be omitted. Various combinations of communication components cold be used for 3GPP GW 403 based on the capabilities of the user devices and available network access. The network applications in the memory of processing circuitry 607 that are not needed for a given combination could be deleted, disabled, or never installed.

Figure 7:
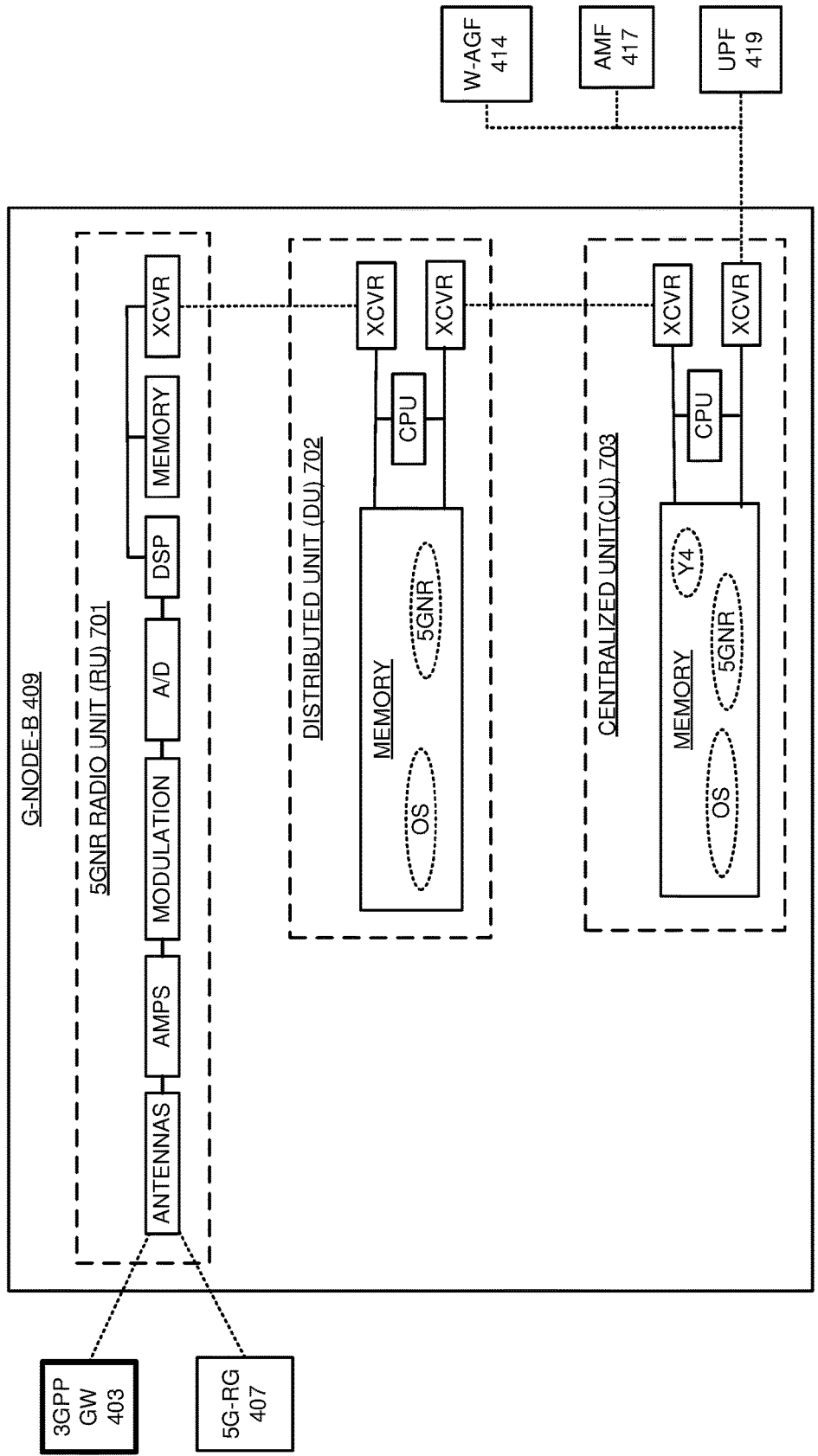
FIG. 7 illustrates an exemplary 3GPP gNodeB in the 5G communication network.

FIG. 7 illustrates exemplary 3GPP gNodeB 409 in 5G communication network 400. 5GNR gNodeB 409 comprises an example of access to 3GPP network 120, although, network 120 access may differ. 5GNR gNodeB 409 comprises 5GNR Radio Unit (RU) 701, Distributed Unit (DU) 702, and Centralized Unit (CU) 703. 5GNR RU 701 comprises antennas, amplifiers, filters, modulation, analog-todigital interfaces, DSP, memory, radio applications, and transceivers that are coupled over bus circuitry. DU 702 comprises memory, CPU, user interfaces and components, and transceivers that are coupled over bus circuitry. The memory in DU 702 stores operating system and 5GNR network applications for physical layer, media access control, and radio link control. CU 703 comprises memory, CPU, and transceivers that are coupled over bus circuitry. The memory in CU 703 stores an operating system, Y4 extension application, and 5GNR network applications for packet data convergence protocol, service data adaption protocol, and radio resource control. The antennas in 5GNR RU 701 are wirelessly coupled to 3GPP GW 403 and 5G-RG 407 over 5GNR links. Transceivers in 5GNR RU 701 are coupled to transceivers in DU 702. Transceivers in DU 702 are coupled to transceivers in CU 703. Transceivers in CU 703 are coupled to W-AGF 414, AMF 417 and UPF 419. The DSP and CPU in RU 701, DU 702, and CU 703 execute the radio applications, operating systems, and network applications to exchange data with 3GPP GW 403, 5G-RG 407, W-AGF 414, AMF 417, and UPF 419.

Figure 8:
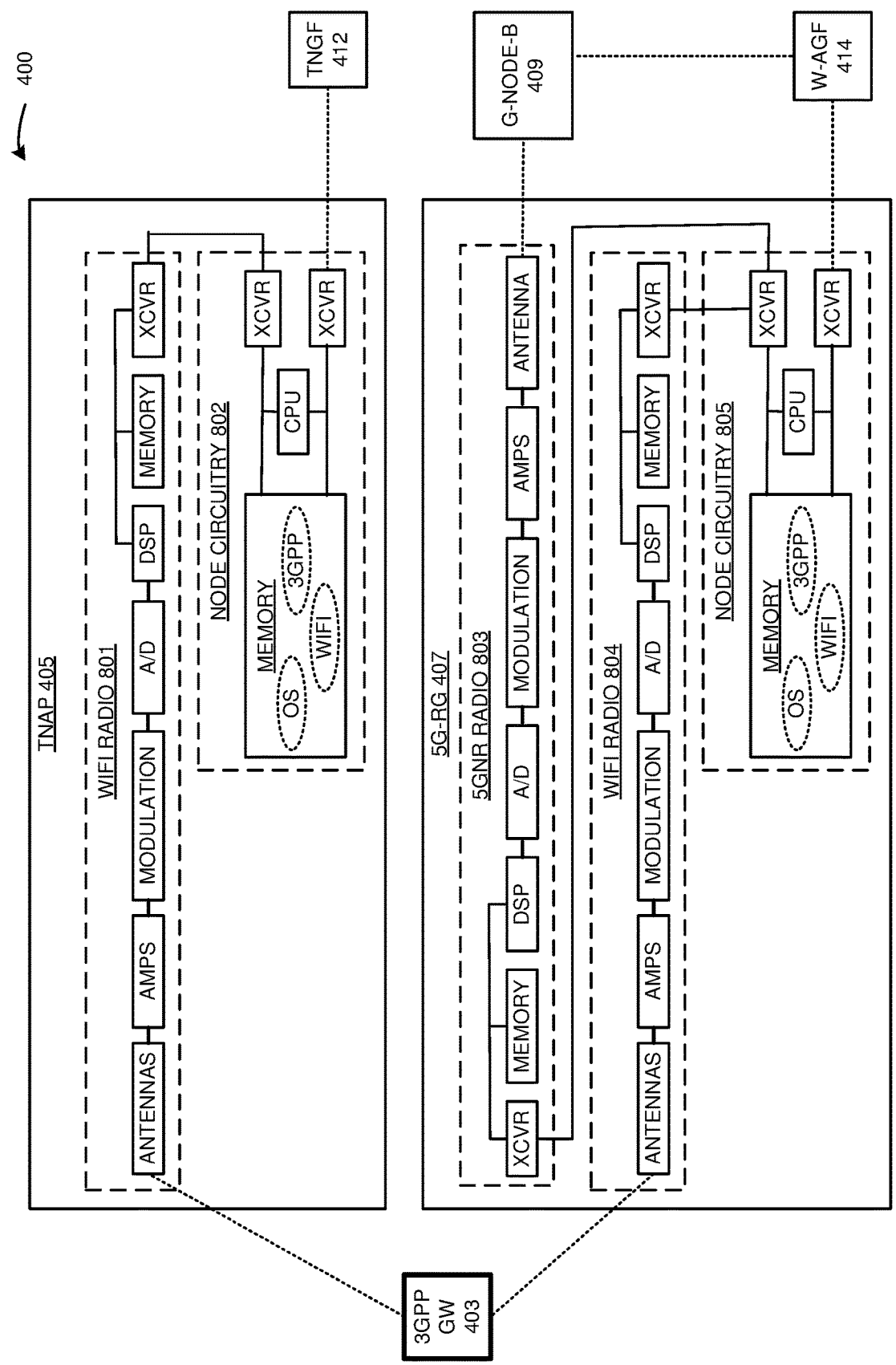
FIG. 8 illustrates an exemplary Trusted Non-3GPP Access Point (TNAP) and an exemplary 5G Residential Gateway (5G-RG) in the 5G communication network.

FIG. 8 illustrates exemplary Trusted Non-3GPP Access Point (TNAP) 405 and exemplary 5G Residential Gateway (5G-RG) 407 in 5G communication network 400. TNAP 405 and 5G-RG 407 comprise examples of access to 3GPP network 120, although, network 120 access may differ. UNAP 404 and TWAP 406 could be similar to TNAP 405. TNAP 405 comprises WIFI radio 801 and node circuitry 802. WIFI radio 801 comprises antennas, amplifiers, filters, modulation, analog-to-digital interfaces, DSP, memory, and transceivers that are coupled over bus circuitry. Node circuitry 802 comprises memory, CPU, user interfaces and components, and transceivers that are coupled over bus circuitry. The memory in node circuitry 802 stores an operating system and network applications for WIFI and 3GPP. The antennas in WIFI radio 801 are wirelessly coupled to 3GPP GW 403 over a WIFI link. Transceivers in WIFI radio 801 are coupled to transceivers in node circuitry 802. Transceivers in node circuitry 802 are coupled to transceivers in TNGF 412. The CPU in node circuitry 802 executes the operating system and network applications to exchange data with 3GPP GW 403 and with TNGF 412.

5G-RG 407 comprises 5GNR radio 803, WIFI radio 804, and node circuitry 805. Radios 803-804 comprise antennas, amplifiers, filters, modulation, analog-to-digital interfaces, DSP, memory, and transceivers that are coupled over bus circuitry. Node circuitry 805 comprises memory, CPU, user interfaces and components, and transceivers that are coupled over bus circuitry. The memory in node circuitry 805 stores an operating system and network applications for WIFI and 3GPP. The antennas in WIFI radio 804 are wirelessly coupled to 3GPP GW 403 over a WIFI link. The antennas in 5GNR radio 803 are wirelessly coupled to 5GNR gNodeB 409 over a 5GNR link. Transceivers in radios 803-804 are coupled to transceivers in node circuitry 805. Transceivers in node circuitry 805 are coupled to transceivers in W-AGF 414. The CPU in node circuitry 805 executes the operating system and network applications to exchange data with 3GPP GW 403, gNodeB 409, and W-AGF 414.

Figure 9:
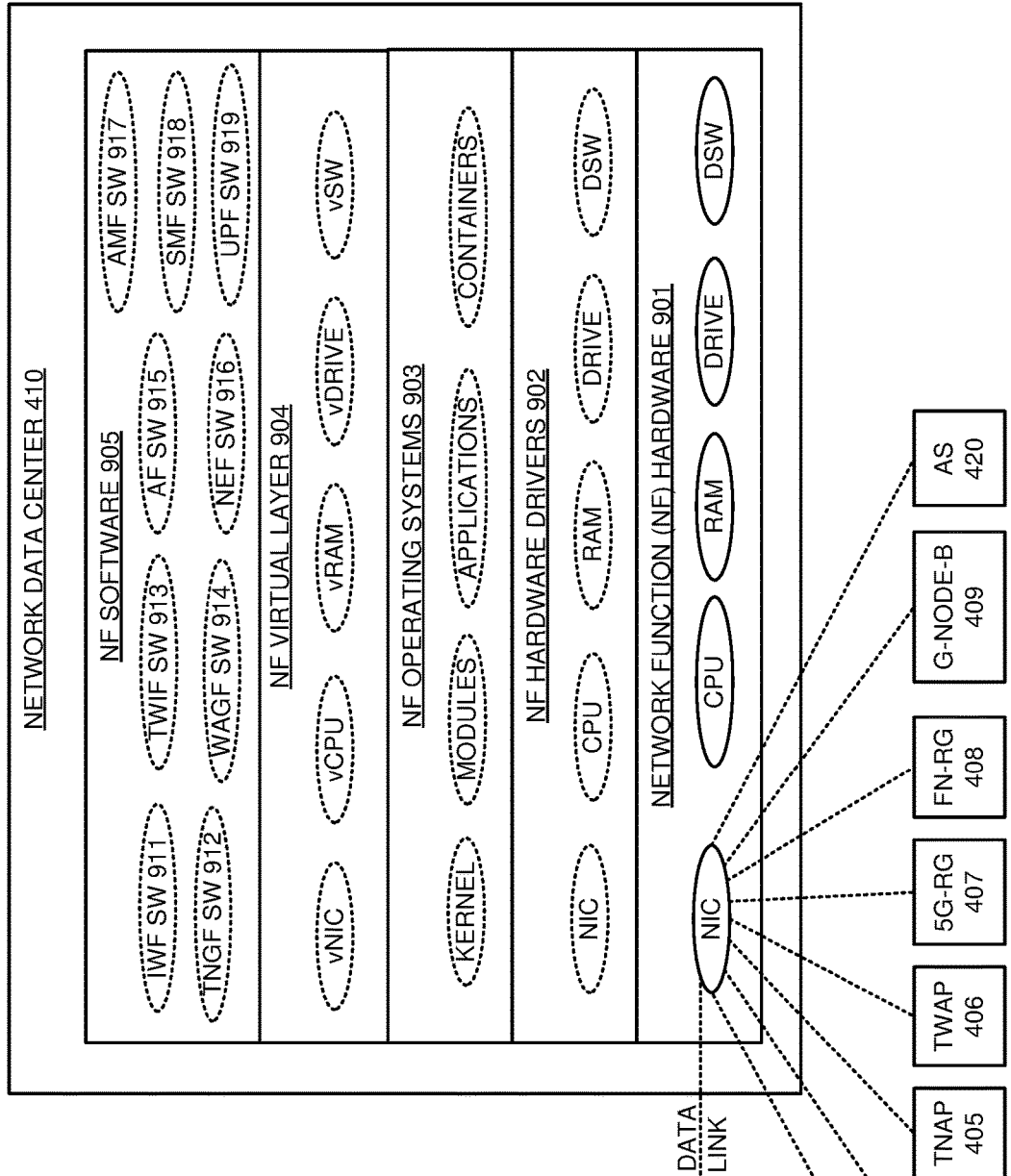
FIG. 9 illustrates an exemplary data center in the 5G communication network.

FIG. 9 illustrates exemplary data center 410 in 5G communication network 400. Network data center 410 comprises an example of 3GPP network 120, although 3GPP network 120 may differ. Network data center 410 comprises Network Function (NF) hardware 901, NF hardware drivers 902, NF operating systems 903, NF virtual layer 904, and NF Software (SW) 905. NF hardware 901 comprises Network Interface Cards (NICs), CPU, RAM, Flash/Disk Drives (DRIVE), and Data Switches (DSW). NF hardware drivers 902 comprise software that is resident in the NIC, CPU, RAM, DRIVE, and DSW. NF operating systems 903 comprise kernels, modules, and applications that form containers for virtual layer and NF software execution. NF virtual layer 904 comprises vNIC, vCPU, vRAM, vDRIVE, and vSW. NF SW 905 comprises IWF SW 911, TNGF SW 912, TWIF SW 913, WAGF SW 914, AF SW 915, NEF SW 916, AMF SW 917, SMF SW 918, and UPF SW 919. Other NF SW like Network Repository Function (NRF) SW are typically present but are omitted for clarity. Network data center 410 may be located at a single site or be distributed across multiple geographic locations. The NIC in NF hardware 901 are coupled to 3GPP GW 403, UNAP 404, TNAP 405, TWAP 406, 5G-RG 407, FN-RG 408, gNodeB 409, AS 420, and external data systems. NF hardware 901 executes NF hardware drivers 902, NF operating systems 903, NF virtual layer 904, and NF SW 905 to form and operate IWF 411, TNGF 412, TWIF 413, W-AGF 414, AF 415, NEF 416, AMF 417, SMF, 418, and UPF 419.

Figure 10:
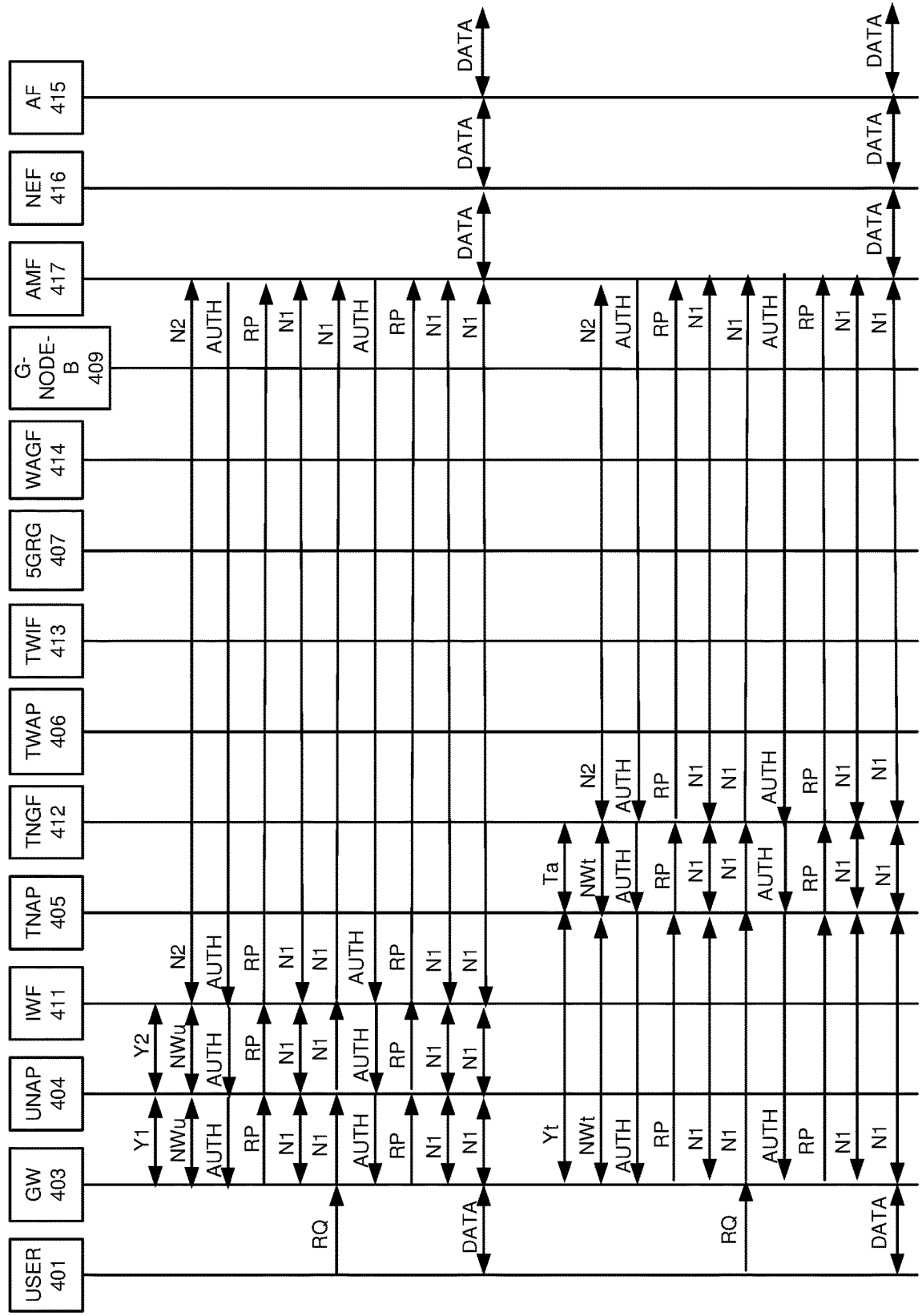
FIG. 10 illustrates an exemplary operation of the 5G communication network that comprises the 3GPP gateway to serve the non-3GPP user device over the 3GPP N1 link.

FIG. 10 illustrates an exemplary operation of 5G communication network 400 that comprises 3GPP gateway 403 to serve non-3GPP user device 401 over the 3GPP N1 link. The operation may differ in other examples. 3GPP GW 403 communicates with UNAP 404 over the Y1 to establish NWu communications with IWF 411 over the Y1 and Y2. 3GPP GW 403 communicates with AMF 417 over the NWu and N2. AMF 417 transfers an authentication request to GW 403 possibly having a random number, and GW 403 transfers an authorization response (RP) to AMF 417 like a hashed result using the random number and a GW ID. AMF 417 authenticates GW 403 based on the authentication response and authorizes GW 403 for N1 service. GW 403 and AMF 417 establish an N1 over the NWu and N2 that traverses UNAP 404 and IWF 411. One of user devices 401 requests a data transaction from GW 403, and GW 403 transfers the request to AMF 417 over the N1 for GW 403. AMF 417 transfers an authentication request for user device 401 to GW 403 possibly having a random number, and GW 403 transfers an authorization response to AMF 417 for user device 401 like a hashed result using the random number and a device 401 ID. AMF 417 authenticates user device 401 based on the authentication response and authorizes user device 401 for N1 service. GW 403 and AMF 417 establish an N1 for user device 401 over the NWu and N2 that traverse UNAP 404 and IWF 411. User device 401 and GW 403 exchange user data over a non-3GPP link. GW 403 and AMF 417 exchange the user data over the N1 that traverses UNAP 404 and IWF 411. AMF 417 and NEF 416 exchange the user data. NEF 416 and AF 415 exchange the user data. AF 415 exchanges the user data with AS 420. In other examples, GW 403 interacts with AMF 417 over the N1 for user device 401 to establish connectivity for user device 401 through UNAP 404, IWF 411, and UPF 419.

3GPP GW 403 communicates with TNAP 405 over the Yt to establish NWt communications with TNGF 412 over the Yt and Ta. 3GPP GW 403 communicates with AMF 417 over the NWt and N2. AMF 417 transfers an authentication request to GW 403 which transfers an authorization response to AMF 417. AMF 417 authenticates GW 403 based on the authentication response and authorizes GW 403 for N1 service. GW 403 and AMF 417 establish an N1 over the NWt and N2 that traverses TNAP 405 and TNGF 412.

One of user devices 401 requests a data transaction from GW 403, and GW 403 transfers the request to AMF 417 over the N1 for GW 403. AMF 417 transfers an authentication request for user device 401 to GW 403, and GW 403 transfers an authorization response to AMF 417 for user device 401. AMF 417 authenticates user device 401 based on the authentication response and authorizes user device 401 for N1 service. GW 403 and AMF 417 establish an N1 for user device 401 over the NWt and N2 that traverse TNAP 405 and TNGF 412. User device 401 and GW 403 exchange user data over a non-3GPP link. GW 403 and AMF 417 exchange the user data over the N1 that traverses TNAP 405 and TNGF 412. AMF 417 and NEF 416 exchange the user data. NEF 416 and AF 415 exchange the user data. AF 415 exchanges the user data with AS 420. In other examples, GW 403 interacts with AMF 417 over the N1 for user device 401 to establish connectivity for user device 401 through TNAP 405, TNGF 412, and UPF 419.

Figure 11:
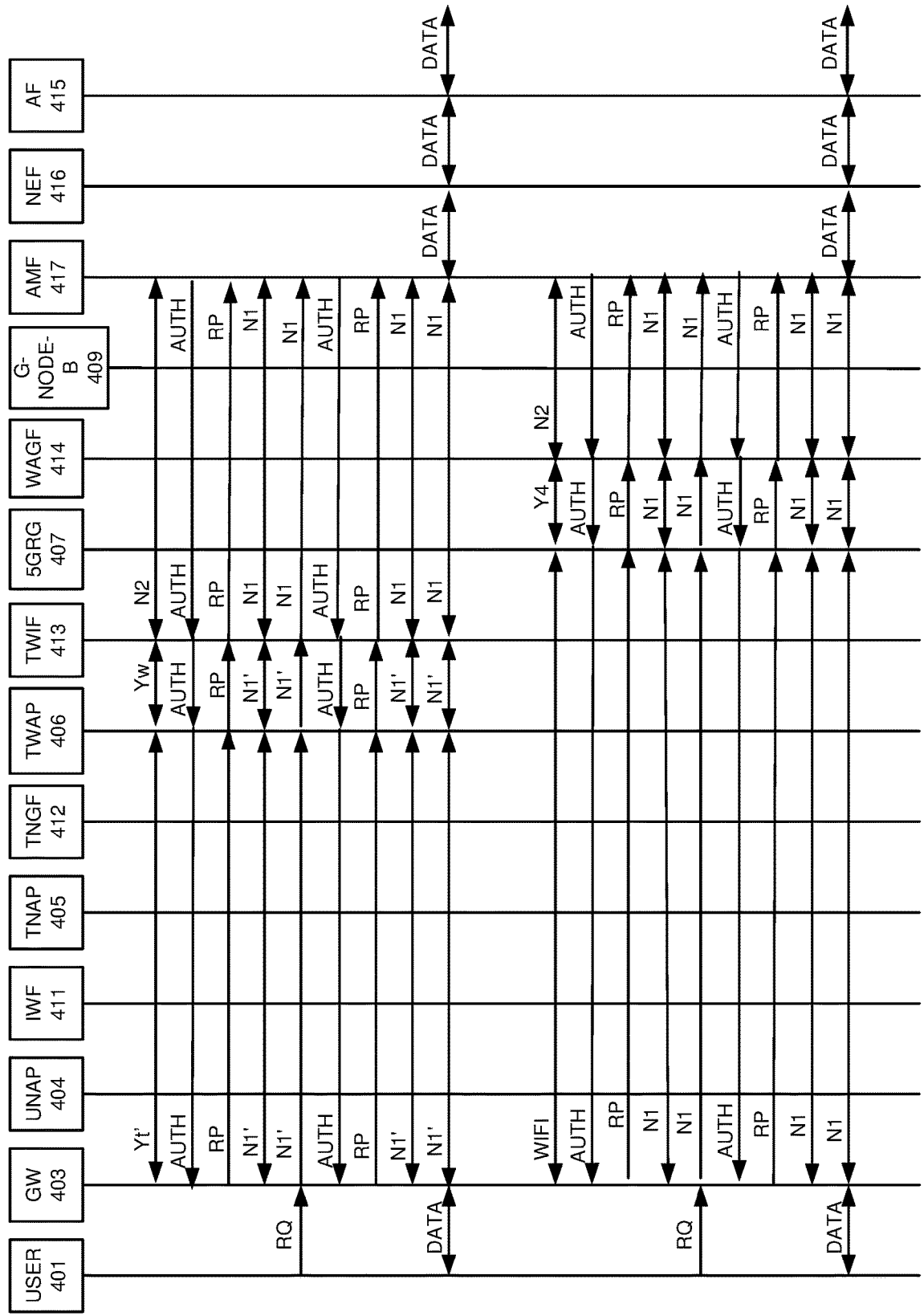
FIG. 11 illustrates an exemplary operation of the 5G communication network that comprises the 3GPP gateway to serve the non-3GPP user device over the 3GPP N1 link.

FIG. 11 illustrates an exemplary operation of 5G communication network 400 that comprises 3GPP gateway 403 to serve non-3GPP user device 401 over the 3GPP N1 link. The operation may differ in other examples. 3GPP GW 403 communicates with TWAP 406 over the Yt' and communicates with TWIF 413 over the Yt' and Yw. 3GPP GW 403 communicates with AMF 417 over the Yt', Yw, and N2 to establish N1' communications with AMF 417 over the Yt', Yw, and N2 that traverses TWAP 406 and TWIF 413. AMF 417 transfers an authentication request to GW 403, and GW 403 transfers an authorization response to AMF 417. AMF 417 authenticates GW 403 based on the authentication response and authorizes GW 403 for N1 service. GW 403 and AMF 417 establish an N1' over the Yt', Yw, and N2 that traverses TWAP 406 and TWIF 413.

One of user devices 401 requests a data transaction from GW 403, and GW 403 transfers the request to AMF 417 over the N1 for GW 403. AMF 417 transfers an authentication request for user device 401 to GW 403, and GW 403 transfers an authorization response to AMF 417 for user device 401. AMF 417 authenticates user device 401 based on the authentication response and authorizes user device 401 for N1 service. GW 403 and AMF 417 establish an N1 for user device 401 over the Yt', Yw, and N2 that traverse TWAP 406 and TWIF 413. User device 401 and GW 403 exchange user data over a non-3GPP link. GW 403 and AMF 417 exchange the user data over the N1 that traverses TWAP 406 and TWIF 413. AMF 417 and NEF 416 exchange the user data. NEF 416 and AF 415 exchange the user data. AF 415 exchanges the user data with AS 420. In other examples, GW 403 interacts with AMF 417 over the N1 for user device 401 to establish connectivity for user device 401 through TWAP 406, TWIF 413, and UPF 419.

3GPP GW 403 communicates with 5G-RG 407 over WIFI and communicates with W-AGF 414 over Y4. 3GPP GW 403 communicates with AMF 417 over WIFI, Y4 and N2 to establish N1 communications with AMF 417 over the WIFI, Y4, and N2 that traverses 5G-RG 407 and W-AGF 414. AMF 417 transfers an authentication request to GW 403, and GW 403 transfers an authorization response to AMF 417. AMF 417 authenticates GW 403 based on the authentication response and authorizes GW 403 for N1 service. GW 403 and AMF 417 establish an N1 over the WIFI and Y4 that traverses 5G-RG 407 and W-AGF 414. One of user devices 401 requests a data transaction from GW 403, and GW 403 transfers the request to AMF 417 over the N1 for GW 403. AMF 417 transfers an authentication request for user device 401 to GW 403, and GW 403 transfers an authorization response to AMF 417 for user device 401. AMF 417 authenticates user device 401 based on the authentication response and authorizes user device 401 for N1 service. GW 403 and AMF 417 establish an N1 for user device 401 over the WIFI, Y4, and N2 that traverse 5G-RG 407 and W-AGF 414. User device 401 and GW 403 exchange user data over a non-3GPP link. GW 403 and AMF 417 exchange the user data over the N1 that traverses 5G-RG 407 and W-AGF 414. AMF 417 and NEF 416 exchange the user data. NEF 416 and AF 415 exchange the user data. AF 415 exchanges the user data with AS 420. In other examples, GW 403 interacts with AMF 417 over the N1 for user device 401 to establish connectivity for user device 401 through 5G-RG 407, W-AGF 414, and UPF 419.

Figure 12:
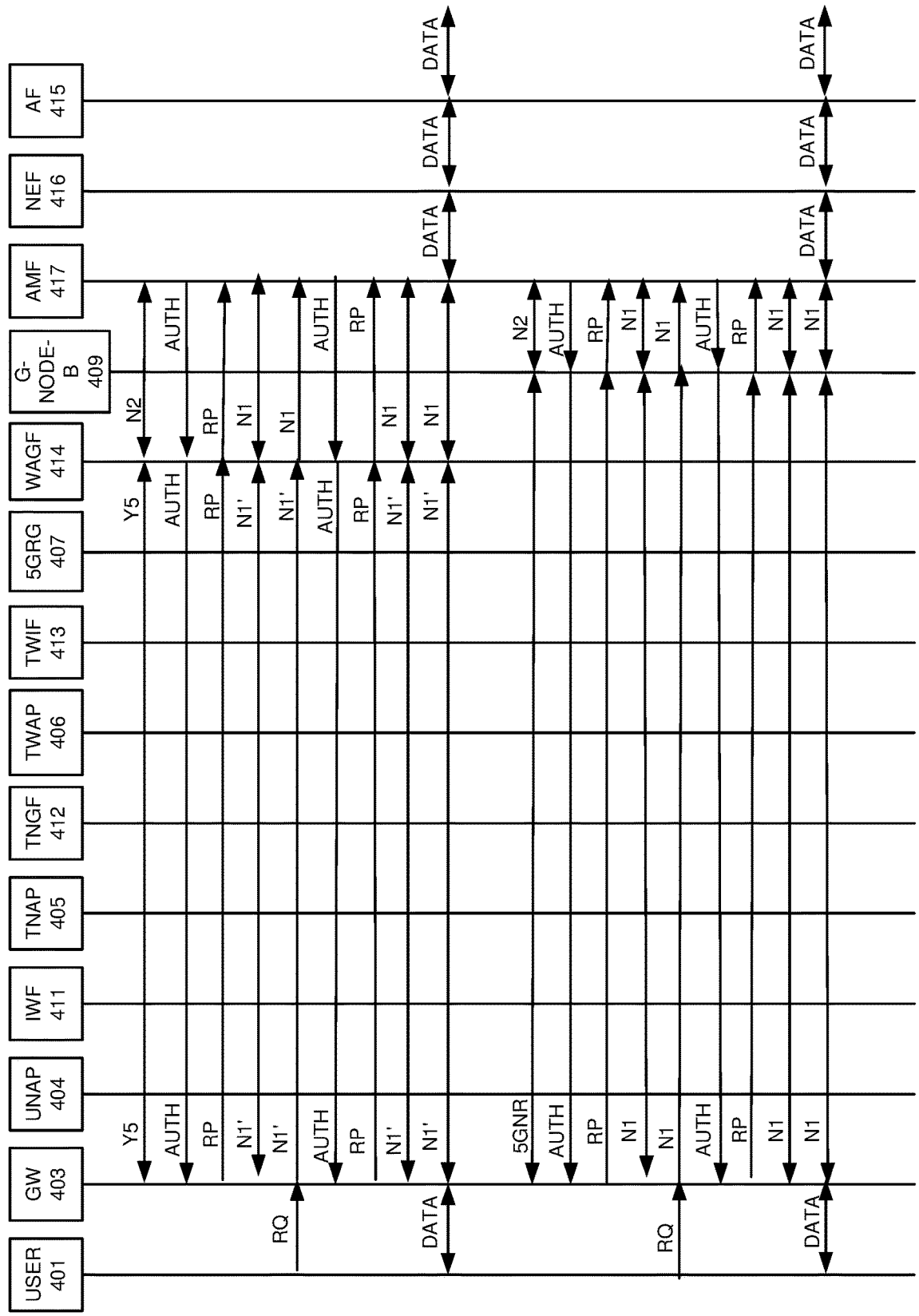
FIG. 12 illustrates an exemplary operation of the 5G communication network that comprises the 3GPP gateway to serve the non-3GPP user device over the 3GPP N1 link.

FIG. 12 illustrates an exemplary operation of 5G communication network 400 that comprises 3GPP gateway 403 to serve non-3GPP user device 401 over the 3GPP N1 link. The operation may differ in other examples. 3GPP GW 403 communicates with W-AGF 414 over Y5. 3GPP GW 403 communicates with AMF 417 over the Y5 and N2 to establish N1 communications with AMF 417 over the Y5 and N2 that traverses W-AGF 414. AMF 417 transfers an authentication request to GW 403, and GW 403 transfers an authorization response to AMF 417. AMF 417 authenticates GW 403 based on the authentication response and authorizes GW 403 for N1 service. GW 403 and AMF 417 establish an N1 over the Y5 that traverses W-AGF 414. One of user devices 401 requests a data transaction from GW 403, and GW 403 transfers the request to AMF 417 over the N1 for GW 403. AMF 417 transfers an authentication request for user device 401 to GW 403, and GW 403 transfers an authorization response to AMF 417 for user device 401. AMF 417 authenticates user device 401 based on the authentication response and authorizes user device 401 for N1 service. GW 403 and AMF 417 establish an N1 for user device 401 over the Y5 and N2 that traverse W-AGF 414. User device 401 and GW 403 exchange user data over a non-3GPP link. GW 403 and AMF 417 exchange the user data over the N1 that traverses W-AGF 414. AMF 417 and NEF 416 exchange the user data. NEF 416 and AF 415 exchange the user data. AF 415 exchanges the user data with AS 420. In other examples, GW 403 interacts with AMF 417 over the N1 for user device 401 to establish connectivity for user device 401 through W-AGF 414 and UPF 419.

3GPP GW 403 communicates with 5GNR gNodeB 409 over 5GNR. 3GPP GW 403 communicates with AMF 417 over the 5GNR and N2 to establish N1 communications with AMF 417 over the 5GNR and N2 that traverses gNodeB 409. AMF 417 transfers an authentication request to GW 403, and GW 403 transfers an authorization response to AMF 417. AMF 417 authenticates GW 403 based on the authentication response and authorizes GW 403 for N1 service. GW 403 and AMF 417 establish an N1 over the 5GNR and N2 that traverses gNodeB 409. One of user devices 401 requests a data transaction from GW 403, and GW 403 transfers the request to AMF 417 over the N1 for GW 403. AMF 417 transfers an authentication request for user device 401 to GW 403, and GW 403 transfers an authorization response to AMF 417 for user device 401. AMF 417 authenticates user device 401 based on the authentication response and authorizes user device 401 for N1 service. GW 403 and AMF 417 establish an N1 for user device 401 over the 5GNR and N2 that traverse gNodeB 409. User device 401 and GW 403 exchange user data over a non-3GPP link. GW 403 and AMF 417 exchange the user data over the N1 that traverses gNodeB 409. AMF 417 and NEF 416 exchange the user data. NEF 416 and AF 415 exchange the user data. AF 415 exchanges the user data with AS 420. In other examples, GW 403 interacts with AMF 417 over the N1 for user device 401 to establish connectivity for user device 401 through gNodeB 409 and UPF 419.

The wireless data network circuitry described above comprises computer hardware and software that form special-purpose gateway circuitry to serve non-3GPP user devices over 3GPP N1 links. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose gateway circuitry to serve non-3GPP user devices over 3GPP N1 links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Third Generation Partnership Project (3GPP) gateway to serve a non-Third Generation Partnership Project (non-3GPP) user device over a 3GPP N1 link, the method comprising: a user transceiver receiving a transaction request from the non-3GPP user device; processing circuitry translating the transaction request into a 3GPP service request; a network transceiver transferring the 3GPP service request to a 3GPP network and receiving an authentication request from the 3GPP network; the processing circuitry generating an authentication response based on the transaction request and the authentication request; the network transceiver transferring the authentication response to the 3GPP network; the processing circuitry establishing the 3GPP N1 link with the 3GPP network for the non-3GPP user device over the network transceiver; the user transceiver exchanging user data with the non-3GPP user device; the processing circuitry interworking the user data and N1 signaling; and the network transceiver exchanging the N1 signaling with the 3GPP network, wherein the 3GPP network interworks the N1 signaling and the user data and exchanges the user data with an external data system.

2. The method of claim 1 wherein the network transceiver transferring the 3GPP service request, receiving the 3GPP authentication request, and exchanging the N1 signaling comprises communicating with a 3GPP Access and Mobility Function (AMF) over an Untrusted Non-3GPP Access Point (UNAP) and a Non-3GPP Interworking Function (IWF).

3. The method of claim 1 wherein the network transceiver transferring the 3GPP service request, receiving the 3GPP authentication request, and exchanging the N1 signaling comprises communicating with a 3GPP Access and Mobility Function (AMF) over a Trusted Non-3GPP Access Point (TNAP) in a Trusted Non-3GPP Access Network (TNAN) and a Trusted Network Gateway Function (TNGF).

4. The method of claim 1 wherein the network transceiver transferring the 3GPP service request, receiving the 3GPP authentication request, and exchanging the N1 signaling comprises communicating with a 3GPP Access and Mobility Function (AMF) over a Trusted Wireless Local Area Network Access Point (TWAP) and a Trusted Wireless Local Area Network Interworking Function (TWIF) in a Trusted Wireless Local Area Network Access Network (TWAN).

5. The method of claim 1 wherein the network transceiver transferring the 3GPP service request, receiving the 3GPP authentication request, and exchanging the N1 signaling comprises communicating with an 3GPP Access and Mobility Function (AMF) over a 3GPP gNodeB in a 3GPP Radio Access Network (RAN).

6. The method of claim 1 wherein the network transceiver transferring the 3GPP service request, receiving the 3GPP authentication request, and exchanging the N1 signaling comprises communicating with a 3GPP Access and Mobility Function (AMF) over a Wireline Access Gateway Function (W-AGF) in a Wireline Fifth Generation Access Network (W-5GAN).

7. The method of claim 1 wherein the network transceiver transferring the 3GPP service request, receiving the 3GPP authentication request, and exchanging the N1 signaling comprises communicating with a 3GPP Access and Mobility Function (AMF) over a Fifth Generation Residential Gateway (5G-RG) and a Wireline Access Gateway Function (W-AGF) in a Wireline Fifth Generation Access Network (W-5GAN).

8. The method of claim 1 wherein the network transceiver transferring the 3GPP service request, receiving the 3GPP authentication request, and exchanging the N1 signaling comprises communicating with a 3GPP Access and Mobility Function (AMF) over a Fifth Generation Residential Gateway (5G-RG), a 3GPP gNodeB, and a Wireline Access Gateway Function (W-AGF).

9. The method of claim 1 wherein the network transceiver comprises an Institute of Electrical and Electronic Engineers (IEEE) 802.11 (WIFI) transceiver.

10. The method of claim 1 wherein the user transceiver comprises an Institute of Electrical and Electronic Engineers (IEEE) 802.11 (WIFI) transceiver.

11. A Third Generation Partnership Project (3GPP) gateway to serve a non-Third Generation Partnership Project (non-3GPP) user device over a 3GPP N1 link, the 3GPP gateway comprising: a user transceiver configured to receive a transaction request from the non-3GPP user device; processing circuitry configured to translate the transaction request into a 3GPP service request; a network transceiver configured to transfer the 3GPP service request to a 3GPP network and receive an authentication request from the 3GPP network; the processing circuitry configured to generate an authentication response based on the transaction request and the authentication request; the network transceiver configured to transfer the authentication response to the 3GPP network; the processing circuitry configured to establish the 3GPP N1 link with the 3GPP network for the non-3GPP user device over the network transceiver; the user transceiver configured to exchange user data with the non-3GPP user device; the processing circuitry configured to interwork the user data and N1 signaling; and the network transceiver configured to exchange the N1 signaling with the 3GPP network, wherein the 3GPP network is configured to interwork the N1 signaling and the user data and exchange the user data with an external data system.

12. The 3GPP gateway of claim 11 wherein the network transceiver is configured to communicate with a 3GPP Access and Mobility Function (AMF) over an Untrusted Non-3GPP Access Point (UNAP) and a Non-3GPP Interworking Function (IWF) to transfer the 3GPP service request, receive the 3GPP authentication request, and exchange the N1 signaling.

13. The 3GPP gateway of claim 11 wherein the network transceiver is configured to communicate with a 3GPP Access and Mobility Function (AMF) over a Trusted Non-3GPP Access Point (TNAP) in a Trusted Non-3GPP Access Network (TNAN) and a Trusted Network Gateway Function (TNGF) to transfer the 3GPP service request, receive the 3GPP authentication request, and exchange the N1 signaling.

14. The 3GPP gateway of claim 11 wherein the network transceiver is configured to communicate with a 3GPP Access and Mobility Function (AMF) over a Trusted Wireless Local Area Network Access Point (TWAP) and a Trusted Wireless Local Area Network Interworking Function (TWIF) in a Trusted Wireless Local Area Network Access Network (TWAN) to transfer the 3GPP service request, receive the 3GPP authentication request, and exchange the N1 signaling.

15. The 3GPP gateway of claim 11 wherein the network transceiver is configured to communicate with a 3GPP Access and Mobility Function (AMF) over a 3GPP gNodeB in a 3GPP Radio Access Network (RAN) to transfer the 3GPP service request, receive the 3GPP authentication request, and exchange the N1 signaling.

16. The 3GPP gateway of claim 11 wherein the network transceiver is configured to communicate with a 3GPP Access and Mobility Function (AMF) over a Wireline Access Gateway Function (W-AGF) in a Wireline Fifth Generation Access Network (W-5GAN) to transfer the 3GPP service request, receive the 3GPP authentication request, and exchange the N1 signaling.

17. The 3GPP gateway of claim 11 wherein the network transceiver is configured to communicate with a 3GPP Access and Mobility Function (AMF) over a Fifth Generation Residential Gateway (5G-RG) and a Wireline Access Gateway Function (W-AGF) in a Wireline Fifth Generation Access Network (W-5GAN) to transfer the 3GPP service request, receive the 3GPP authentication request, and exchange the N1 signaling.

18. The 3GPP gateway of claim 11 wherein the network transceiver is configured to communicate with a 3GPP Access and Mobility Function (AMF) over a Fifth Generation Residential Gateway (5G-RG), a 3GPP gNodeB, and a Wireline Access Gateway Function (W-AGF) to transfer the 3GPP service request, receive the 3GPP authentication request, and exchange the N1 signaling.

19. The 3GPP gateway of claim 11 wherein the network transceiver comprises an Institute of Electrical and Electronic Engineers (IEEE) 802.11 (WIFI) transceiver.

20. The 3GPP gateway of claim 11 wherein the user transceiver comprises an Institute of Electrical and Electronic Engineers (IEEE) 802.11 (WIFI) transceiver.

* * * * *